Figure 1:
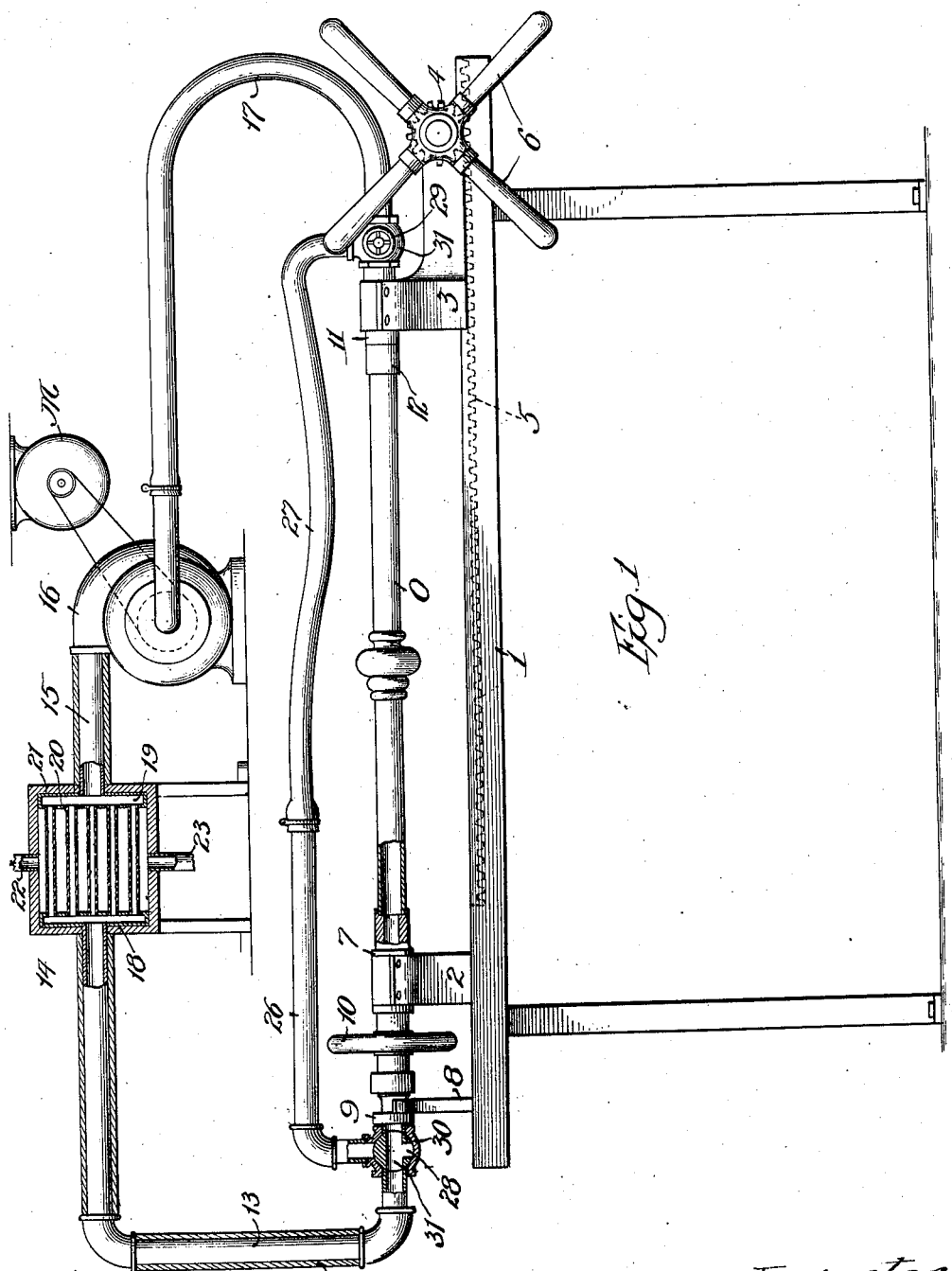

J. L. ISAACS.
LACQUERING HEATING SYSTEM.
APPLICATION FILED NOV. 6, 1909.

1,000,412.

Patented Aug. 15, 1911
2 SHEETS—SHEET 1.

Witnesses:
Geo. C. Davison
Charles J. Schmidt

Inventor
Joel L. Isaacs
By Offield, Towle, Graves & Offield
Attys.

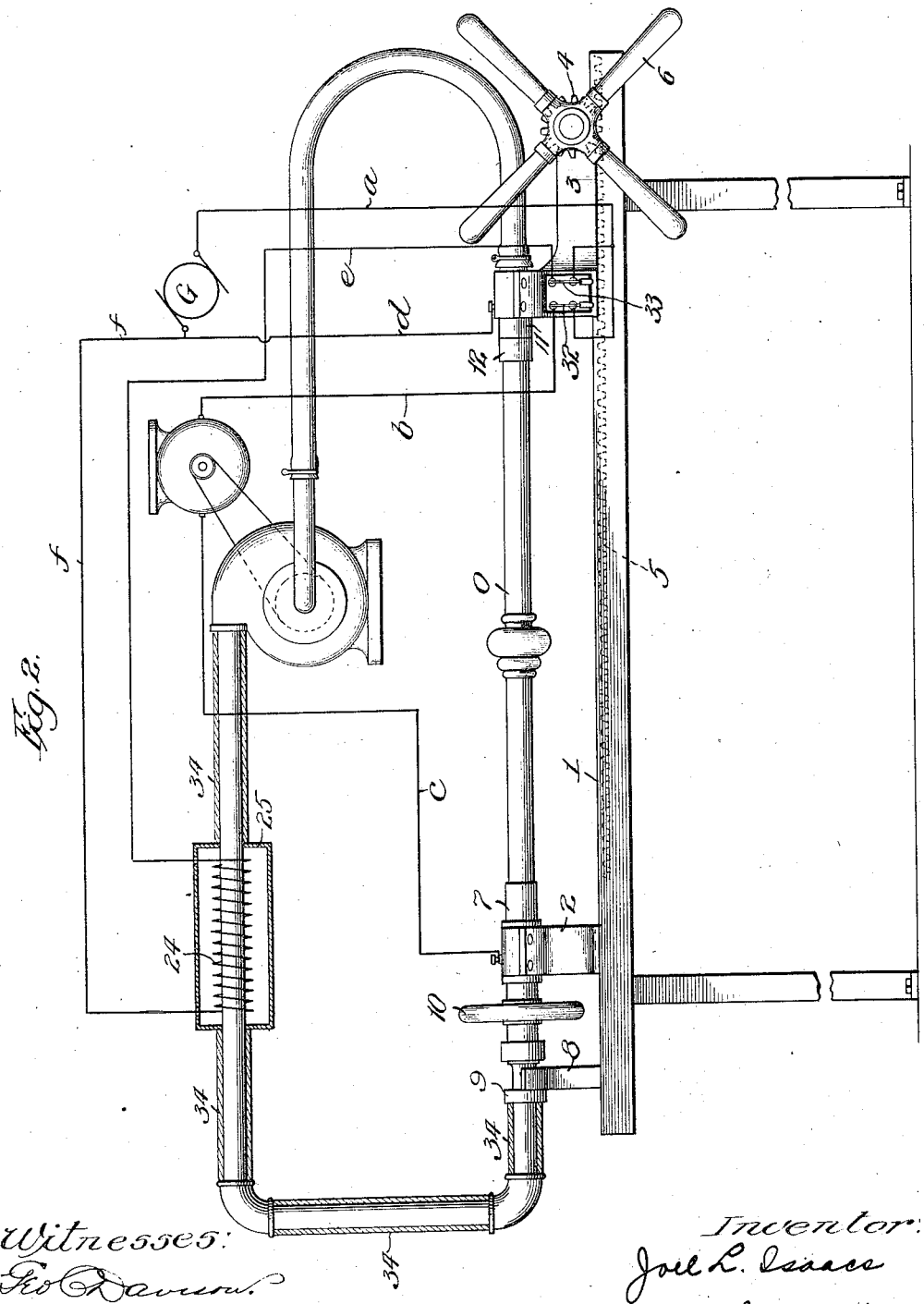

UNITED STATES PATENT OFFICE.

JOEL L. ISAACS, OF RED BANK, NEW JERSEY.

LACQUERING HEATING SYSTEM.

1,000,412.   Specification of Letters Patent.   Patented Aug. 15, 1911.

Application filed November 6, 1909. Serial No. 526,487.

*To all whom it may concern:*

Be it known that I, JOEL L. ISAACS, residing at Red Bank, in the county of Monmouth and State of New Jersey, have invented certain new and useful Improvements in Lacquering Heating Systems, of which the following is a complete, clear, full, and precise specification.

My invention relates to lacquering heating systems particularly to systems in which metallic pieces such as tubes, sleeves or the like for bedsteads are to be continuously heated while coats of lacquer are applied thereto.

In applying lacquer to metallic parts, in order that lacquer may be uninterruptedly applied coat after coat, it is necessary that the parts be kept at a temperature which will dry one coat as fast as it is applied so that succeeding coats can be applied without interruption and loss of time. The parts to be lacquered must also be heated uniformly and the heating means must be such that the heat will be confined to the system and will not radiate to make it uncomfortable for the operators.

The main object of my invention is to provide mechanism which will cause circulation of heating medium such as hot air through a fixed path into which path a part to be lacquered can be included so that the hot air will flow through the object to uniformly heat it during the lacquer application process.

Another object of my invention is to adapt the mechanism so that parts to be lacquered can be quickly inserted in the path and turned while in the path to facilitate the application of lacquer to all parts thereof.

Another object is to provide means either manually or automatically operative to prevent the escape of hot air from the path during the interval when a finished object is taken from the system and an unfinished object applied thereto.

Another object is to provide means whereby the flow through the path will be automatically stopped upon removal of an object from the system, and will be automatically re-started when another object is inserted.

Another object is to provide means for confining the heat to the system and to prevent radiation of heat into space.

All the various features of my invention are fully described in the accompanying specification and shown in the accompanying drawings in which drawings—

Figure 1 is an elevation view showing more or less diagrammatically object supporting means and the heat circulating system connected therewith, and Fig. 2 is a similar view showing somewhat modified arrangement.

The object supporting means comprises a table 1 on whose top are mounted a stationary head stock 2 and a slidable head stock 3, the slidable head stock pivoting a pinion 4 which engages in a rack 5 extending longitudinally along the top of the table, a hand wheel 6 being connected with the pinion so that the pinion may be turned and the tail stock moved longitudinally along the table top. The head stock 2 pivots the front end of a hollow spindle 7 whose rear end pivots on a bearing standard 8, the rear end of the standard having rotatable connection in a stationary connecting frame 9. Between the head stock 2 and the standard 8 a hand wheel 10 is secured to the hollow spindle so that the spindle can be turned by hand. In the tail stock 3 is journaled a hollow sleeve 11 whose front end 12 is relatively rotatable. Between the inner ends of spindle 7 and part 12 an object $o$ such as the tubular part of a bedstead frame can be clamped so that the hollow object forms a continuation of the hollow spindle 7 and the hollow part 12 and sleeve 11, turning of the hand wheel 10 causing turning of the object. The left end of spindle 7 communicates with piping 13 which connects with one end of a heating drum 14, the other end of this drum connecting through pipe 15 with the outlet of a fan 16 driven from any source such as an electrical motor M. The outer end of sleeve 11 connects with a flexible pipe 17 whose other end communicates with the inlet of the fan 16. The heating drum comprises the end sections 18 and 19 with which pipes 13 and 15 respectively communicate, the inner walls of the sections being connected by a plurality of pipes 20, so that air blown through the heater is spread to give a large heat receiving surface. Inclosing the heater is a frame 21 connected at one end with piping 22 which receives heating medium such as steam from some suitable source, while the other end of the inclosing frame connects with exhaust piping 23. When the fan is in operation the air is kept in circulation through the path including the piping referred to and the object o and this air is heated by the steam flowing about the heater 14. The temperature of the air flow can be adjusted so that the object will be heated sufficiently to cause quick drying of lacquer applied thereto so that successive coats can be applied without interruption. The flexible piping 17 enables the tail stock to be moved so that objects of different length can be inserted in the heating path. The heating mechanism for heating the air can be of any suitable design. For example, as shown in Fig. 2 this mechanism could be in the form of a winding 24 encircling the piping at some point and receiving current from a generator G, the winding section being inclosed in a frame 25 so that the heat from the winding is concentrated on the piping.

It is desirable that escape of air from the path be prevented when an object is removed from the system, as when a finished object is being replaced by an unfinished object. Referring to Fig. 1, I have shown means whereby the object section of the path can be shunted during the time that the object is removed. The shunt path comprises a pipe 26 and a flexible pipe section 27, the pipe section 26 connecting with the piping 13 near the left end standard 8 and the flexible piping connecting with the right end of sleeve 11, a valve 28 being interposed between piping 26 and piping 13 and a valve 29 being interposed between piping 27 and sleeve 11. The valves are of the same construction each having a rotatable valve block 30 provided with a T port 31, each valve block being connected with an actuating wheel 31. When an object is inserted between the head and tail stocks the valve blocks are turned to connect piping 13 with spindle 7 and piping 17 with sleeve 11, and to shut off passageway to the shunt path through piping 26 and 27. Before the object is removed the valve blocks are turned to disconnect piping 13 and 17 from the spindle 7 and sleeve 11, and to connect this piping with the shunt piping 26 and 27 so that flow of air will be shunted from the object through the shunt path, this preventing any escape of air from the circulating system. Instead of having a shunt path the operator could simply unclutch the fan from the motor or stop the motor before taking out the piping, and in Fig. 2 I have shown a switch 32 which controls the circuit from the generator G to the motor which enables the operator to stop the motor and fan at any time. In order to save time this disconnection of the motor can be accomplished automatically by the removal of the object, and re-starting of the motor accomplished automatically by the re-insertion of the object. When an object is in position current will flow from the generator through conductor a, the closed switch 32, conductor b, through the motor, through conductor c to the head stock 2, thence through the object to the part 12 and sleeve 11 to the tail stock and from thence through conductor d back to the generator, the switch 32 and the object being included serially in this circuit. The operator can stop the motor and fan at any time by opening switch 32, or switch 32 can remain closed and the circuit opened whenever an object is removed from the system. Upon re-insertion of an object the circuit will be automatically closed and the motor and fan will again operate. It is understood of course that all the parts included in the circuit are properly insulated from other parts in order to prevent short circuits. It may also be desirable to cut out the heating system whenever there is no object in position. In Fig. 1 this can be readily accomplished by the operation of suitable valve mechanism for controlling the steam flow. In Fig. 2 I have shown another switch 33 for controlling the circuit through the heating coil 24. When the switch is closed current flows from the generator through conductor a, switch 33, conductor e, coil 24 and back to the generator through conductor f, whereby the heating coil can be cut from the circuit by opening switch 33. By thus being adapted to prevent the escape of heat or the circulation of heat and air when there is no object in place, the heat will be confined to the system and will not radiate into space to make it uncomfortable for the operators and to unduly heat the room in which the system is situated. As an additional guard against radiation of heat the piping can be covered with some non-conducting material 34 such as asbestos.

I do not wish to be confined to the precise arrangements and controls I have shown, as many other arrangements are possible for carrying out the main purpose of my invention, namely, to establish a confined circuit through which heated air can be passed, in which circuit objects to be heated can be inserted and in which system escape of hot air into space can be readily prevented when there is no object in position.

I therefore desire to secure the following claims by Letters Patent.

1. In a lacquering heating system, the combination of a piping forming a closed path, means for causing air flow through said path, means for applying heat to said path to heat the air flowing therethrough, two parallel branches connected with said path, terminals for one of said branches for receiving a hollow object to be lacquered, and means for closing the path through either one of said branches.

2. In a lacquering heating system, the combination of terminals for receiving a tubular object to be heated and lacquered, main piping connecting said terminals, a blower connecting with said main piping for causing air flow therethrough, a heater associated with said main piping to heat the air flowing therethrough, a shunt piping path about said terminals, and means for deflecting the flow through said shunt piping upon removal of said object from said terminals.

3. In a lacquering heating system, the combination of tubular terminals for receiving between them a hollow object to be lacquered, main piping bridging said terminals, a fan included in said main piping for causing air flow therethrough, heating means associated with said main piping for heating the air flowing therethrough, substitute connection between said terminals, and valve mechanism for connecting either said terminals or said substitute connection with said main piping whereby the heated air may flow entirely through said object to be lacquered or through said substitute connection upon removal of the object from said terminals.

4. In a lacquering heating system, the combination of rotatable tubular terminals adapted for receiving between them a hollow object to be lacquered, main piping bridging said terminals, a fan for causing air flow through said piping, heating means for heating the air flow through said piping, a substitute path bridging said terminals, and valve mechanism for closing the path through the main piping either through said terminals and the object between said terminals or through said substitute connection, said rotatable terminals enabling turning of the object during the application of lacquer thereto.

5. In a lacquering heating system, the combination of terminals, piping bridging said terminals, means for causing air flow through said piping, means for heating the air flowing through said piping, said terminals being adapted to receive between them objects to be lacquered, an object when inserted between said terminals forming a closed path with said piping through which the heated air can repeatedly circulate, and means for maintaining said closed path upon removal of the object from the terminals.

6. In a lacquering heating system, the combination of piping forming a closed path, means for circulating air through said path, means for heating the circulated air, and hollow clamping jaws connecting with said path, said hollow jaws serving to support between them a hollow object to be lacquered to bridge said object about part of said path to receive the heated air flow.

JOEL L. ISAACS.

Witnesses:
A. J. MARRATT,
J. FRANK RESEBIE.